(12) United States Patent
Segall et al.

(10) Patent No.: US 7,876,833 B2
(45) Date of Patent: Jan. 25, 2011

(54) METHOD AND APPARATUS FOR ADAPTIVE UP-SCALING FOR SPATIALLY SCALABLE CODING

(75) Inventors: Christopher Andrew Segall, Camas, WA (US); Shaw-min Lei, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1644 days.

(21) Appl. No.: 11/139,963

(22) Filed: May 26, 2005

(65) Prior Publication Data

US 2006/0268991 A1    Nov. 30, 2006

Related U.S. Application Data

(60) Provisional application No. 60/670,825, filed on Apr. 11, 2005.

(51) Int. Cl.
H04B 1/66 (2006.01)

(52) U.S. Cl. .............. 375/240.24; 375/240.25; 375/240.26; 375/240.29; 375/240.02; 375/240.12; 375/240.13; 382/233; 382/235; 382/261; 382/239; 382/246; 382/238

(58) Field of Classification Search ............ 375/240.24, 375/240.25, 240.26, 240.29, 240.02, 240.12, 375/240.13; 382/233, 235, 238, 239, 246, 382/240.23, 261
See application file for complete search history.

(56) References Cited

U.S. PATENT DOCUMENTS

| | | | |
|---|---|---|---|
| 5,565,920 A | 10/1996 | Lee et al. | |
| 6,504,872 B1 * | 1/2003 | Fimoff et al. | 375/240.27 |
| 2004/0076333 A1 | 4/2004 | Zhang et al. | |
| 2004/0161035 A1 | 8/2004 | Wedi | |
| 2004/0213345 A1 | 10/2004 | Holcomb et al. | |
| 2004/0252901 A1 | 12/2004 | Gunnewiek et al. | |
| 2005/0019000 A1 | 1/2005 | Lim et al. | |
| 2006/0083308 A1 * | 4/2006 | Schwarz et al. | 375/240.16 |

FOREIGN PATENT DOCUMENTS

WO    03036980    5/2003

OTHER PUBLICATIONS

European Patent Office, "Partial European Search Report," Nov. 20, 2009, 5 pgs.

(Continued)

*Primary Examiner*—Shawn An
(74) *Attorney, Agent, or Firm*—Stolowitz Ford Cowger LLP

(57) ABSTRACT

Adaptive up-sample filtering is used to improve compression efficiency of spatially scalable coding systems by more effectively predicting the high-resolution (enhanced-layer) video (or image) from the low-resolution lower-layer video (or image). Different up-sample filters adaptive to local image properties are selectively used for different portions of a low resolution frame to generate a better up-sampled image. Selection between different up-sample filters is determined by a variety of different information available to both the encoder and decoder. In one embodiment, the up-sample filters are selected by the encoder and then explicitly identified to the decoder. Other techniques are then used to minimize the cost of transmitting the up-sample filter identifiers. In alternative embodiments, the encoder and decoder independently make up-sample filters selections.

21 Claims, 10 Drawing Sheets

OTHER PUBLICATIONS

Blaszak et al., "Scalable AVC Codec," Mar. 6, 2004.
Wedi, "Advanced motion compensated prediction methods," Oct. 18, 2003.
Wedi, "New Results on Adaptive Interpolation Filter," May 10, 2002.
Schwarz et al., "SVC Core Experiment 2.1: Inter-layer prediction of motion and residual data," Jul. 14, 2004.
Tambankar et al., "An overview of H.264/MPEG-4 part 10," Jul. 2, 2003.

* cited by examiner

RATE-DISTORTION PERFORMANCE OF A
FRAME FROM THE MOBILE AND CALENDAR SEQUENCE

RATE-DISTORTION PERFORMANCE
OF A FRAME FROM THE BUS SEQUENCE

RATE-DISTORTION PERFORMANCE OF
A FRAME FROM THE FLOWER GARDEN SEQUENCE

RATE-DISTORTION PERFORMANCE OF
A FRAME FROM THE PARIS SEQUENCE

METHOD AND APPARATUS FOR ADAPTIVE UP-SCALING FOR SPATIALLY SCALABLE CODING

This application claims priority from U.S. Provisional Ser. No. 60/670,825, filed Apr. 11, 2005.

BACKGROUND

A high interest in scalable video coding in recent years resulted in the currently developing Scalable Video Coding (SVC) standard by JVT (Joint Video Team), by International Organization for Standardization and International Electrotechnical Commission (ISO/IEC) Motion Picture Experts Group (MPEG) and International Telecommunication Union Telecommunication Standardization Sector (ITU-T) Video Coding Experts Group (VCEG). The SVC standard will support different scalabilities, including different combinations of temporal, spatial, and quality scalabilities.

Spatial scalability is usually achieved by using a layered approach. A full-resolution original video sequence is spatially down-sampled to a low-resolution video sequence. The full-resolution and low-resolution video sequences go through two parallel video encoders, and are then output as an enhanced layer (high-resolution) coded bit-stream and a base layer (low-resolution) coded bit-stream.

In order to achieve a good coding efficiency, inter-layer prediction is used. Two kinds of inter-layer prediction include inter-layer intra texture prediction and inter-layer motion prediction. The inter-layer intra texture prediction provides an extra option where an upper-layer (or enhanced-layer) intra block can be predicted by a block up-sampled from the reconstructed lower-layer (or base-layer) frames, usually from the corresponding low-resolution reconstructed image block.

A fixed interpolation filter is typically used for the up-sampling process. For example, in the current JSVM (Joined Scalable Verification Model) for the developing SVC standard, a fixed 6-tap filter is used for the up-sampling process. However, the single fixed up-sample interpolation filter may not accurately up-sample different image blocks in the same frame. This limits the effectiveness of the inter-layer prediction process.

The present invention addresses this and other problems associated with the prior art.

SUMMARY OF THE INVENTION

Adaptive up-sample filtering is used to improve compression efficiency of spatially scalable coding systems by more effectively predicting the high-resolution (enhanced-layer) video (or image) from the low-resolution lower-layer video (or image). Different up-sample filters adaptive to local image properties are selectively applied to different portions of a low resolution frame to generate a better up-sampled image. Selection between different up-sample filters is determined by a variety of different information available to both the encoder and decoder. In one embodiment, the up-sample filters are selected by the encoder and then explicitly identified to the decoder. Other techniques are then used to minimize the cost of transmitting the up-sample filter identifiers. In alternative embodiments, the encoder and decoder independently make up-sample filters selections.

The foregoing and other objects, features and advantages of the invention will become more readily apparent from the following detailed description of a preferred embodiment of the invention which proceeds with reference to the accompanying drawings.

DETAILED DESCRIPTION

Figure 1:
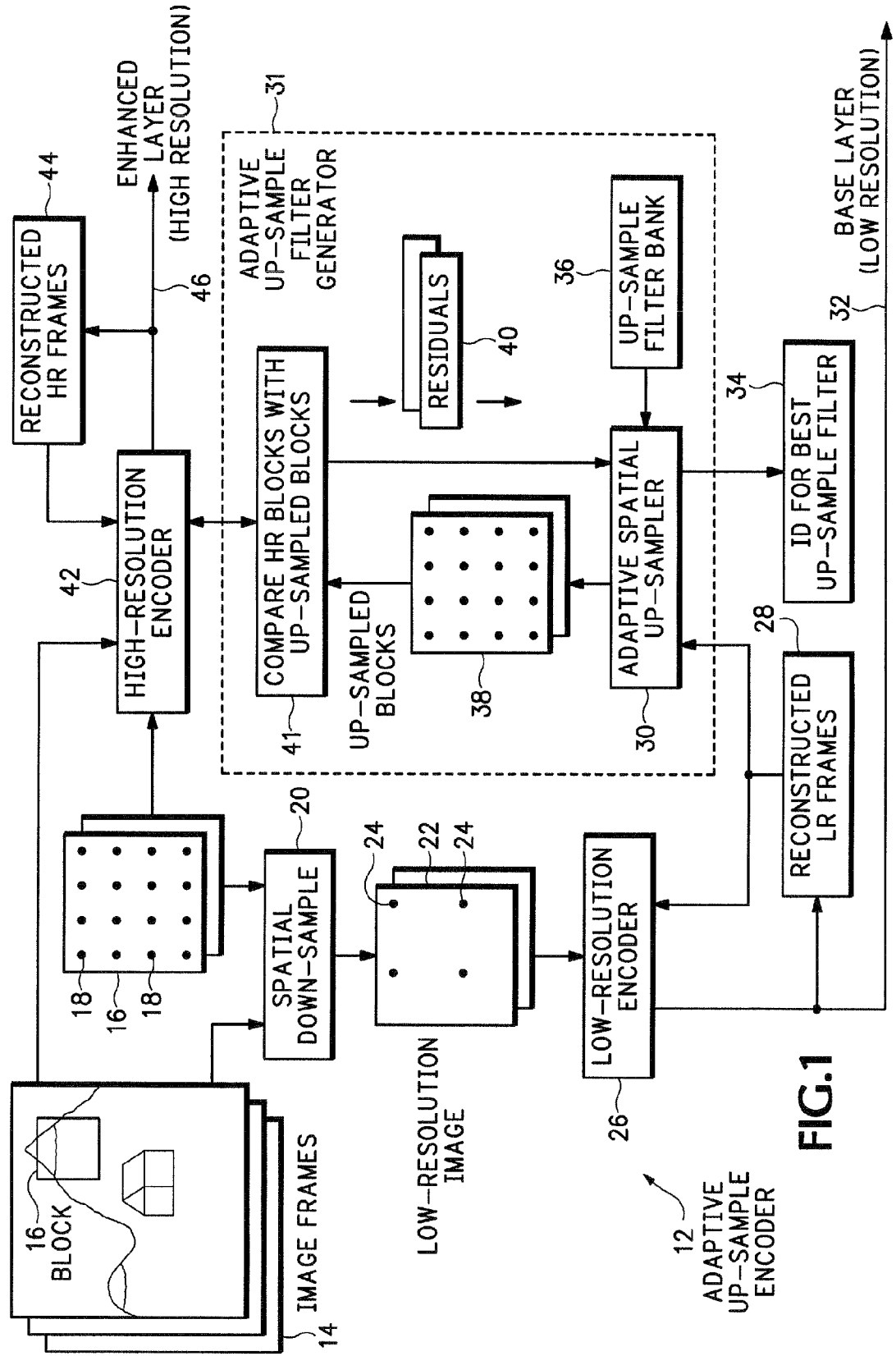
FIG. 1 is a diagram of an encoder that uses adaptive spatial up-sampling.

FIG. 1 shows an encoder 12 that provides adaptive spatial up-sampling. One or more frames 14 can contain any sort of image data that may need to be encoded. The adaptive up-sample filtering described below can be used in any data encoding application. For example, the frames 14 may need to be encoded prior to being transported over a wireless communications system. In another embodiment, the frames 14 may be encoded prior to being formatted into packets for transporting over a packet switched network, such as the Internet. In one specific application, the encoder 12 is used for encoding both high and standard definition television signals. In another example, the frames 14 may be encoded prior to being stored in a storage media. In this example, the frames 14 may be generated by a video camera that then encode the frames prior to being stored on a Digital Video Disc (DVD), magnetic tape, Integrated Circuit (IC) memory, etc.

The frames 14 are referred to below as enhanced layer frames or alternatively as high-resolution frames. The frames 14 are processed on both a block-by-block basis and on a frame-by-frame basis by the encoder 12. Individual image blocks 16 contain a given number of image samples (pixels). In the example shown in FIG. 1, image blocks 16 contain a 4×4 array of image samples 18. Of course this is only one example, and the actual size of the image blocks 16 can vary depending on the type of encoding scheme used by encoder 12. The image blocks 16 are alternatively referred to as micro-blocks, macro-blocks, or sub-blocks depending on the size of the image blocks and whether or not the image blocks 16 contain sub-blocks. For example, image blocks 16 containing multiple sub-blocks may be referred to as macro-blocks.

A high-resolution encoder 42 conducts various prediction, transform, and quantization operations on the high-resolution frames 14 that are described in more detail below in FIG. 3. The encoded enhanced layer frames 46 are either output over a transmission media or stored in a storage media. Reconstructed high-resolution frames 44 are stored in the encoder 12 and then fed back to the high-resolution encoder 42 for conducting different prediction operations.

Base-layer (low-resolution) encoding, starts with a spatial down-sample operation 20 that reduces the number of samples in the high-resolution image blocks 16. In this example, the spatial down-sample operation 20 reduces the 4×4 image blocks 16 into 2×2 down-sampled low-resolution image blocks 22. The image samples 24 in the low-resolution image blocks 22 are encoded by a low-resolution encoder 26 using various prediction, transform, quantization, etc. operations that are also described in more detail below. The encoded base-layer (low-resolution) frames 32 are also output either over the transmission medium or to the storage media. Reconstructed low-resolution frames 28 are stored in memory and fed back to the low-resolution encoder 26 for conducting low-resolution prediction encoding operations.

Adaptive Spatial Up-Sampling

Of particular interest is an adaptive up-sample filter generator 31 that selects different up-sample filters for up-sampling individual image blocks 16. An adaptive spatial up-sampler 30 uses different up-sample filters from filter bank 36 to convert image blocks from the reconstructed low-resolution frames 28 into different up-sampled prediction blocks 38. The up-sampled prediction blocks 38 are compared in comparator 41 with corresponding high-resolution image blocks provided by high-resolution encoder 42.

In this example, the adaptive spatial up-sampler 30 takes into account the residuals 40 that result from the comparison of the high-resolution image blocks with the up-sampled prediction blocks 38. For example, the up-sample filter 36 generating the smallest residuals 40 may be determined to be the optimal up-sample filter for predicting the corresponding high-resolution block. An identifier 34 identifying the selected optimal up-sample filter 34 for the associated image block is then sent along in the encoded bit stream 46 to a decoder. In a preferred embodiment, the side information 34 would be considered part of the encoded enhancement bit stream 46 and is not part of the encoded base layer 32. However, the side information 34 can be encoded in other parts of the encoded transmissions 46 or 32. The same process for identifying the optimal up-sample filter 34 is then performed for other image blocks 16 in the same frame 14.

Figure 2:
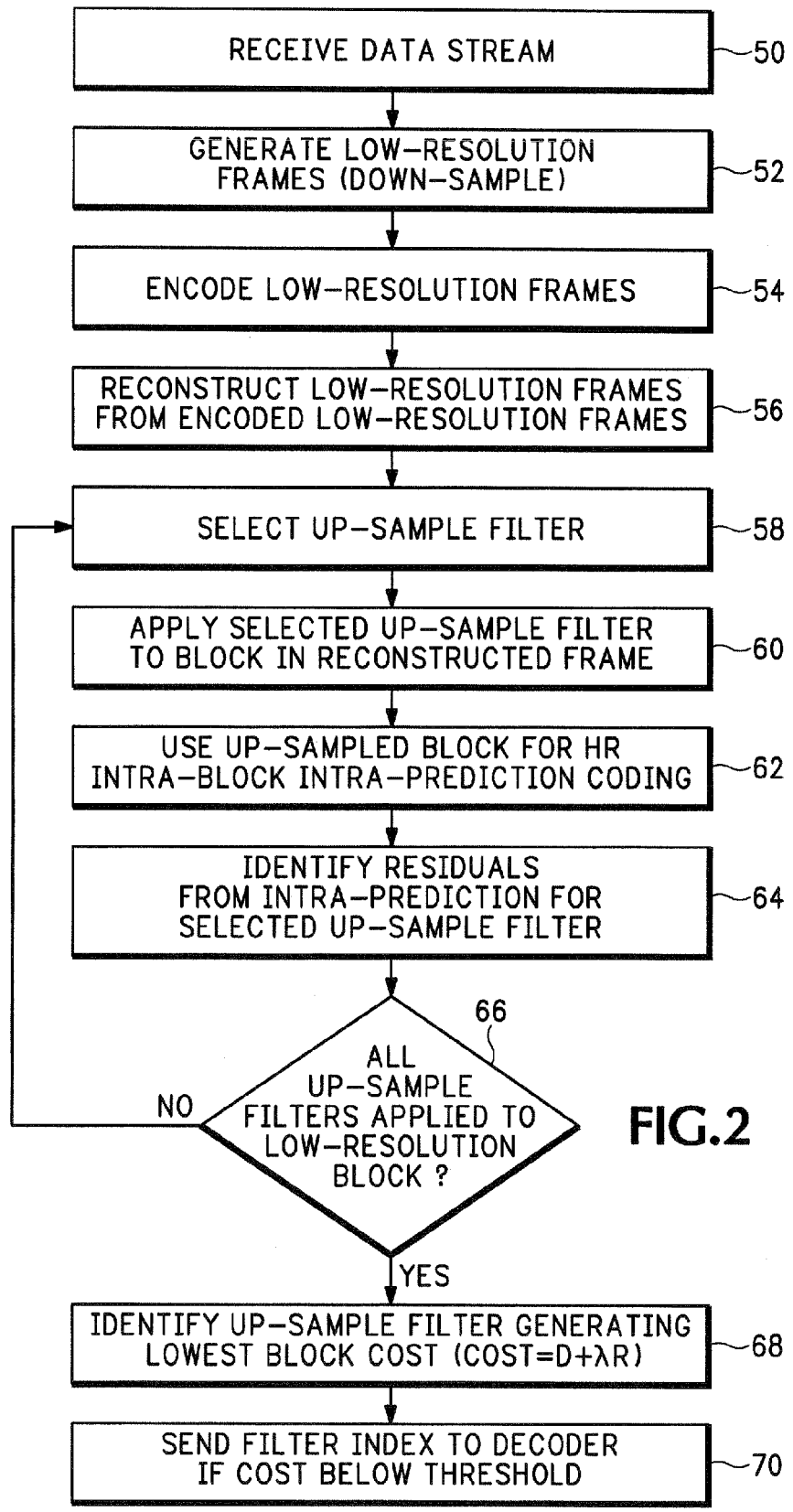
FIG. 2 is a flow diagram describing in more detail the operations for the encoder shown in FIG. 1.

FIG. 2 is a flow diagram describing the up-sample filter selection process in more detail. Referring to FIGS. 1 and 2, in operation 50, the encoder receives the data sequence 14. The low-resolution frames are generated in down-sample operation 52 and the low-resolution frames encoded in operation 54. The low-resolution frames are then reconstructed from the encoded low-resolution data in operation 56. The adaptive spatial up-sampler 30 in operation 58 selects one of the up-sample filters in filter bank 36 and in operation 60 applies the selected up-sample filter to a low-resolution image block in the reconstructed frame.

In operation 62, the up-sampled image block is used in a high-resolution intra-prediction encoding operation and the residuals identified in operation 64. The adaptive spatial up-sampler 30 (FIG. 1) in operation 66 repeats the intra-prediction operation for multiple available up-sample filters in filter bank 36. In one implementation, the spatial up-sampler 30 in operation 68 then identifies the up-sample filters that generates the lowest block cost for the associated block.

In one example, the cost factor if represented as follows: Cost=D+λR, where D is the distortion created during the encoding process, R is the bit rate required for sending the residual data and identifying the up-sample filter, and λ is some constant. Of course, other cost criteria can also be used to determine which up-sample filter to use, if any.

There should be less residual data 40 when the selected up-sample filter accurately predicts the image values in the corresponding high-resolution image block. Alternatively, there may be more resulting residual data from the intra-prediction coding operation when the selected up-sample filter does not accurately predict the image values in the associated high-resolution image block. Therefore, the residual values may be taken into account when determining the best up-sample filters for predicting corresponding high-resolution blocks.

However, even though one up-sample filter may generate the lowest residual value, the distortion in the image block created using that up-sample filter may be relatively high. In this situation, an up-sample filter that generates more residual data, but produces significantly less distortion, may be selected by the adaptive spatial up-sampler 30.

In another situation, the image block may produce a relatively large amount of distortion D or residual data R. For example, a significant amount of image information may have been lost during the spatial down-sampling operation 20 or during the encoding operations. In these situations, when the cost factor may be above some predetermined threshold in operation 70, no up-sample filter is identified for the associated image block. If the cost is below the threshold, the identity of the lowest cost up-sample filter may be transmitted to the encoder or stored along with the encoded image sequences in operation 70.

Figure 3:
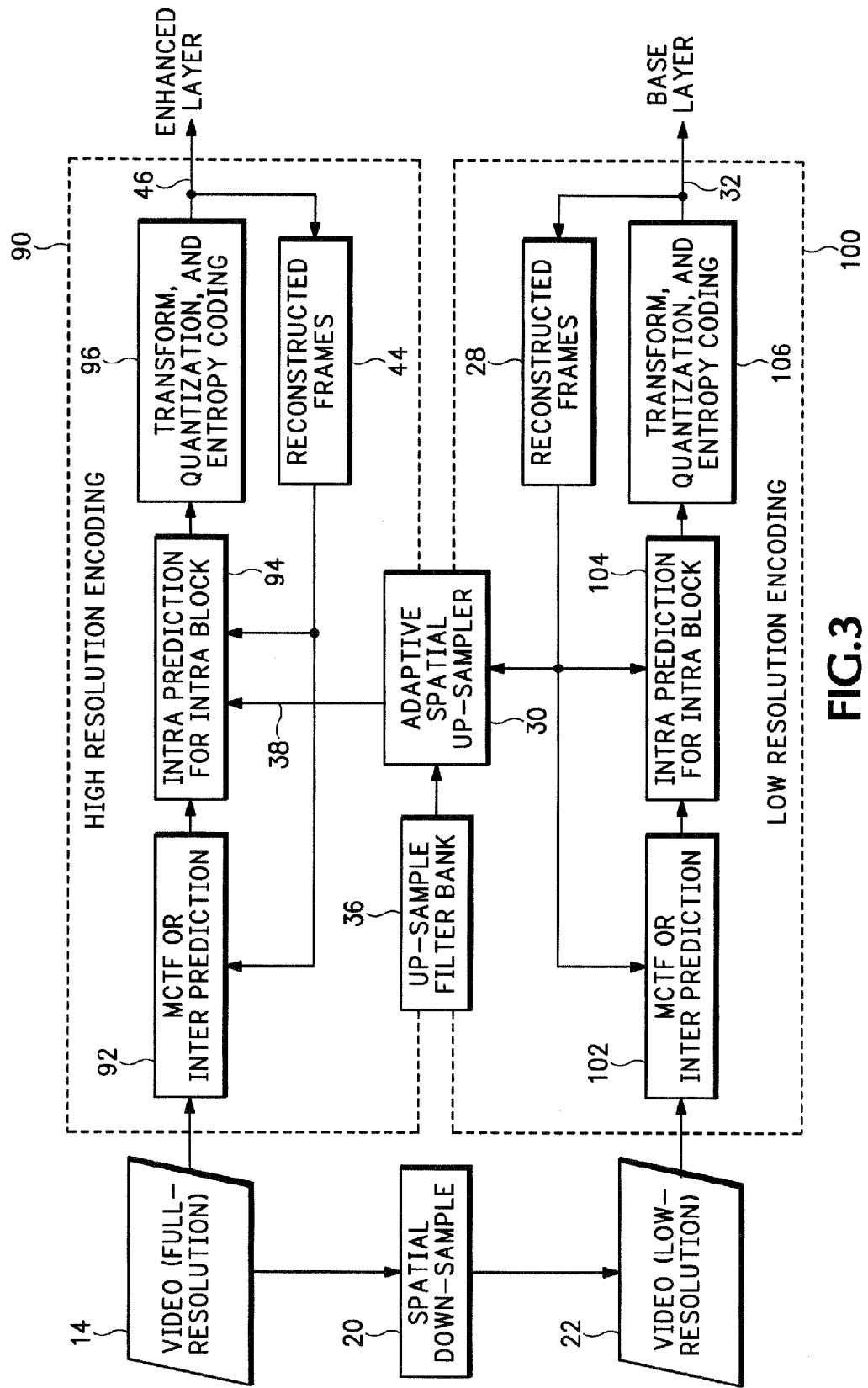
FIG. 3 is a more detailed diagram of the encoder in FIG. 1.

FIG. 3 shows the adaptive spatial up-sample encoder 12 in more detail. As previously described in FIG. 1, the full-resolution video sequence 14 is processed by the spatial down-sample operation 20 to generate a low-resolution video sequence 22. A Motion Compensated Temporal Filtering (MCTF) or inter-prediction operation 92 identifies the similarities between temporally adjacent high-resolution frames for generating frame predictions. A similar operation 102 is performed for the low-resolution video sequence 22.

An intra-prediction operation 94 identifies the similarities between spatially adjacent image blocks to further encode and provide block predictions for the high-resolution video sequence 14. A similar intra-prediction operation 104 is also performed for the low-resolution video sequence 22. Final coding operations 96 and 106 in the high resolution video and low-resolution video sequences, respectively, then transform, quantize and entropy code the residuals remaining after the predictions operations.

The adaptive spatial up-sampler 30 generates up-sampled image blocks using the up-sample filters from filter bank 36. The up-sampled image blocks are then used during the intra prediction operation 94 for the high-resolution video sequence 14. For example, if an up-sampled image block 38 closely matches a corresponding high resolution image block in intra prediction operation 94, only the corresponding encoded low-resolution image block and any residuals may be encoded and transmitted in encoded bit streams 46 and 32.

Transmitting Adaptive Up-Sample Filter Information

Figure 4:
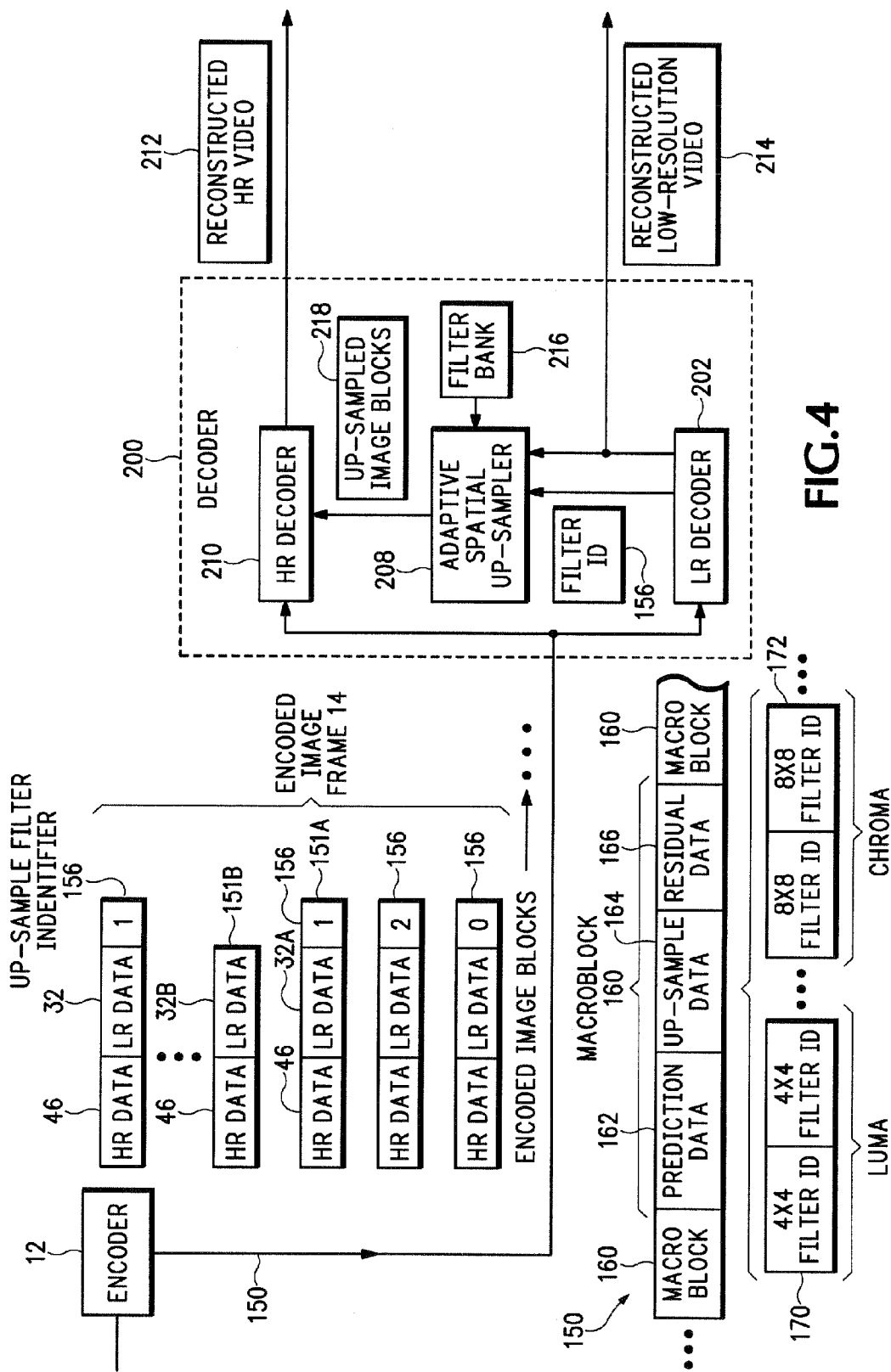
FIG. 4 is a diagram showing how the encoder sends up-sample filter identifiers to a decoder.

FIG. 4 shows some examples of how the up-sample filters selected by the encoder 12 are communicated to a decoder 200. In one example, the encoder 12 sends an encoded bit stream 150 to the decoder 200. The encoded bit stream 150 includes both the encoded high resolution data 46 and the encoded low-resolution data 32 associated with different image blocks in the image sequence 14 (FIG. 1). Side information 156 identifies the up-sample filter selected by the encoder 12.

Additional compression schemes may be used to reduce the amount of side information 156 that needs to be transmitted to the decoder 200. Some possible compression schemes include differential coding, predictive coding, context-based entropy coding, and context-based predictive coding. Most of these compression schemes try to utilize the existing information available at both the encoder 12 and decoder 200 to reduce hidden redundancy in the side information 156.

Further reductions in side channel bits 156 can be accomplished by controlling the up-sampling filter at a granularity larger than a block. For example, the side information 156 can select the classification rules and/or up-sample filter for an entire sequence of image blocks, pictures or slices of the frame. This is shown in encoded bit stream 150 where encoded image block 151A may identify an up-sample filter "1". However, a subsequent encoded image block 151B may not have any associated up-sample filter identifier 156.

In this case, the adaptive spatial up-sampler 208 in decoder 200 may use the same filter "1" identified for the previous encoded image block 151A for up-sampling image block 151B. As a second example, the adaptive spatial up-sampler 208 in decoder 200 may use a default up-sample filter contained in filter bank 216 for encoded image blocks, such as encoded block 151B, that do not include an associated up-sample filter identifier 156. The default filter can be pre-defined or signaled/transferred using side channel bits.

It is also possible to avoid sending any side information 156. The encoder 12 and decoder 200 may each select up-sample filters for each image block based on information available at both the encoder 12 and decoder 200 at selection time. For example, image blocks in the full-resolution layer and in the low-resolution layer 32 are reconstructed. These reconstructed image blocks can include the reconstructed image pixels as well as additional information transmitted to the decoder 200 to construct the block, e.g. quantization intervals and mode information. Both the encoder 12 and decoder 200 may independently select up-sample filters using the already provided encoded information that is normally contained with the encoded image blocks.

Multiple different up-sample filter identifiers can be associated with different image block sizes and different chroma and lumina data. For example, macroblocks 160 in the encoded bit stream 150 may contain prediction data 162, up-sample data 164 and residual data 166. The up-sample data 164 can contain up-sample filter identifiers 170 and 172 for the different luma and chroma subblocks associated with the same macroblock 160. For example, the luma data in the encoded image may be encoded in 4×4 image blocks and the chroma data may be encoded in 8×8 image blocks. Different up-sample filters 170 and 172 may then be identified for these different luma and chroma blocks.

In another embodiment, the decoder 200 can predict the up-sample filters from the available encoded data stream 150 without receiving any explicit side band signaling 156 from the encoder 12. However, the encoder 12 can then correct the prediction when necessary. For example, the encoder 12 can send explicit override signals through the encoded bit-stream 150 that direct the decoder 200 to use a specific up-sample filters. In another implementation, the encoder 12 sends correction signaling through the encoded bit-stream 150 that may not explicitly identify the up-sample filters, but directs the decoder 200 to increment/decrement the predicted up-sample filter by a signaled value.

The encoder 12 can also assign different sets of up-sample filters to different groups of image blocks. For example, the filter bank 216 in decoder 200 may store multiple different sets of up-sample filters. The encoder signals which set of up-sample filters in the filter bank 216 is active for particular groups of image blocks. For example, the encoder 12 may activate a first set of filters for a first luma frame and activate a second set of up-sample filters for a chroma frame. The encoder 12 can also switch the active set of up-sample filters used by the decoder 200 for different sub-portions of the same frames.

Adaptive Up-Sample Decoding

Referring still to FIG. 4, the high resolution data 46 in the encoded bit stream 150 is decoded by a high resolution decoder 210 and the low resolution data 32 is decoded by a low-resolution decoder 202 in decoder 200. The low-resolution decoder 202 converts the low-resolution encoded data 32 into a reconstructed low-resolution video sequence 214. The reconstructed low-resolution frames 214 are also supplied to the adaptive spatial up-sampler 208. If there is a filter identifier 156 associated with an image block, the spatial up-sampler 208 uses the corresponding filter in filter bank 216 to generate the up-sampled image block 218. The up-sampled block 218 are then used in the high-resolution decoder 210 to reconstruct the corresponding high-resolution video sequence 212.

Figure 5:
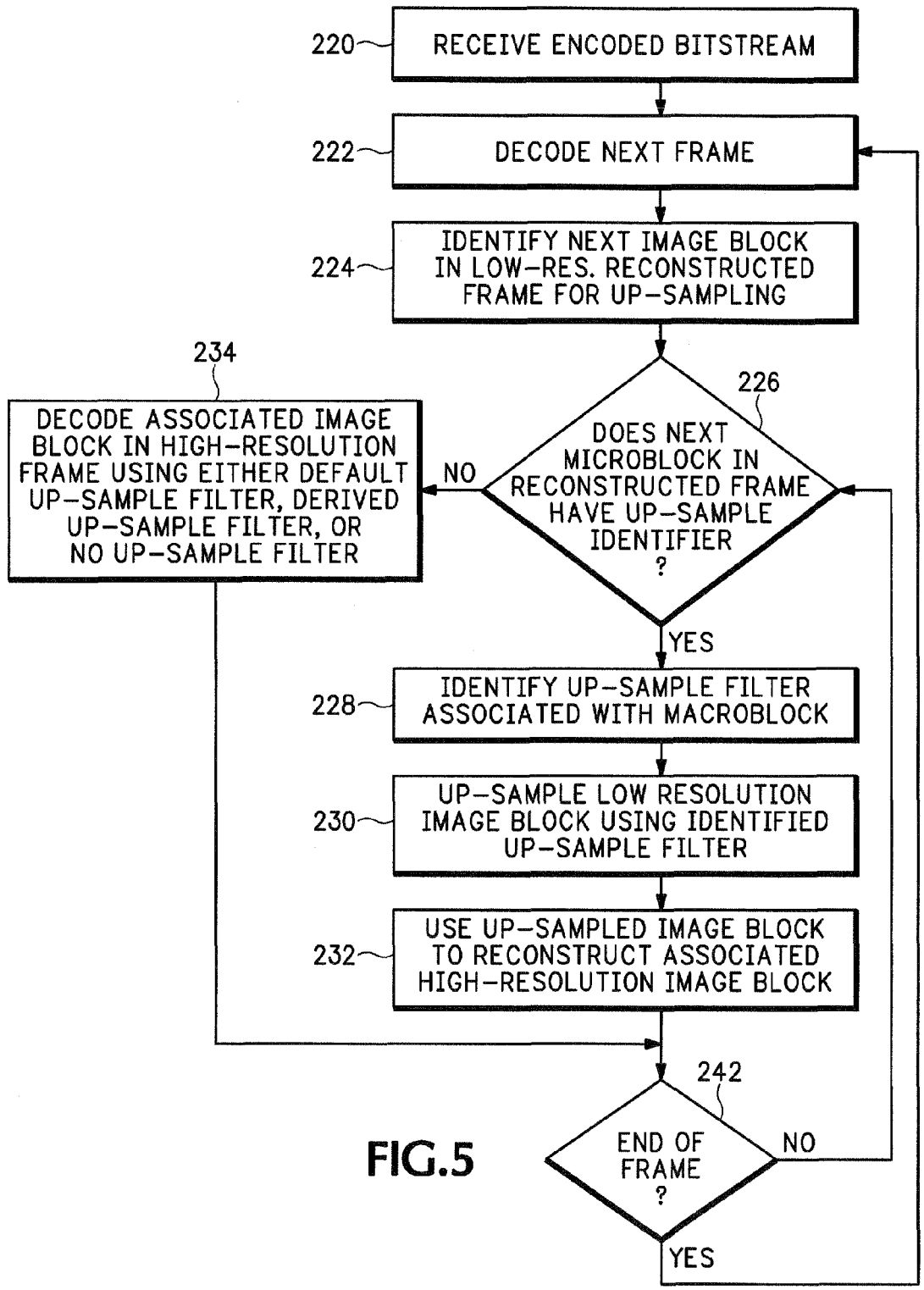
FIG. 5 is a flow diagram showing how the decoder in FIG. 4 operates.

FIG. 5 explains in more detail the operations that are performed by the decoder 200 in FIG. 4. The decoder receives the encoded bit stream in operation 220. A next low-resolution frame is decoded in operation 222 and the image blocks extracted from the reconstructed low-resolution frame in operation 224.

The decoder in operation 226 determines if the image blocks have associated up-sample filter identifiers. If there is no filter identifier, the decoder in operation 224 may use a default up-sample filter. Alternatively, the adaptive spatial up-sampler may independently determine which of the up-sample filters in filter bank 216 to use based on some criteria, such as the type of intra-block encoding, identified block energy, etc. In yet another implementation, if there is no up-sample filter identifier 156 for the image block in operation 226, the decoder 200 may not use the low-resolution image block for reconstructing the associated high-resolution image block.

If the image block has an associated up-sample filter identifier in operation 226, the associated up-sample filter is selected from the filter bank 216 in operation 228. The selected up-sample filter is used for up-sampling the low resolution image block in operation 230 and the resulting up-sampled image block then used to reconstruct the corresponding high-resolution image block in operation 232. If there are other remaining image blocks in the same frame in operation 242, the decoder goes back to operation 226 and determines if the next image block in the frame has an associated up-sample filter identifier. The process above is then repeated in operation 242.

Figure 6:
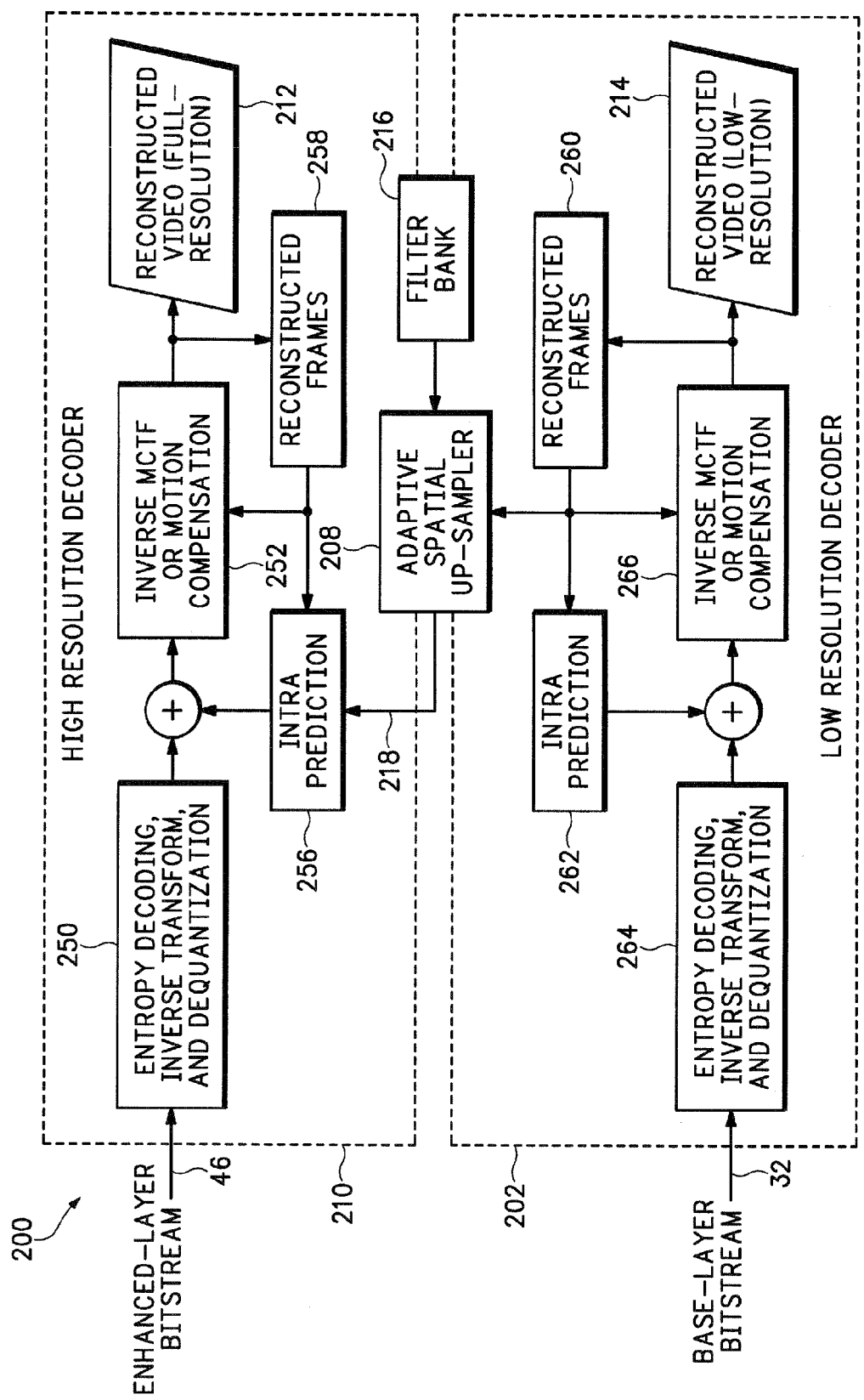
FIG. 6 is a more detailed diagram of the decoder in FIG. 4.
Figure 7:
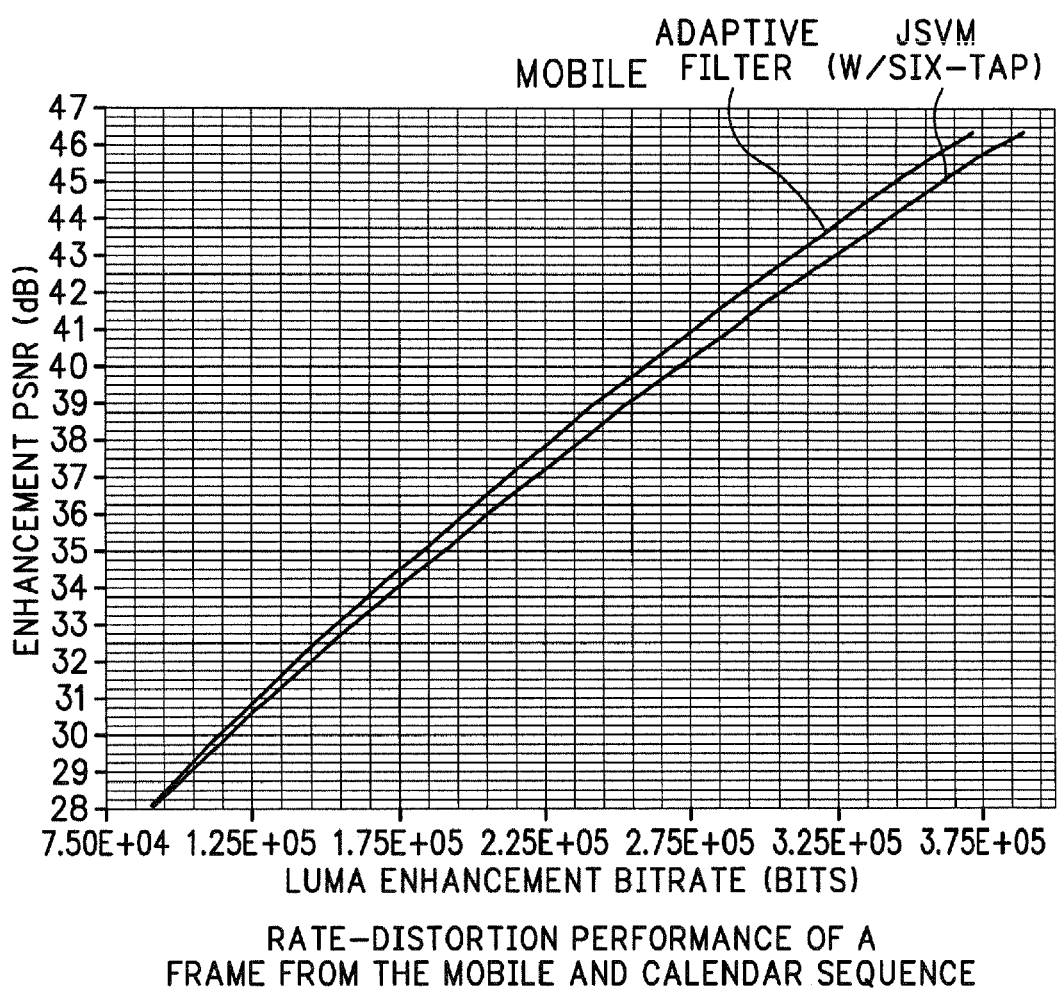
FIGS. 7-10 shows results from adaptive up-spatial up-sampling from different images.
Figure 8:
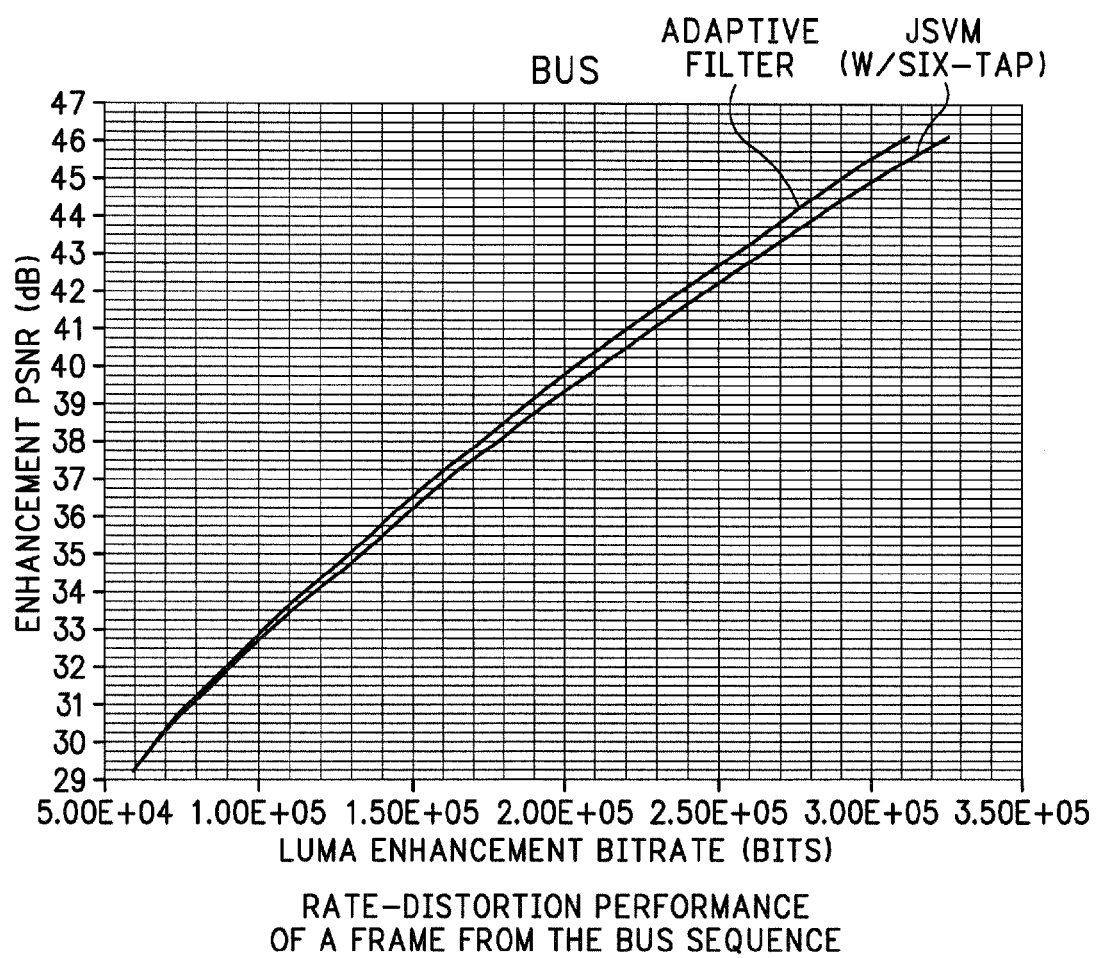
Figure 9:
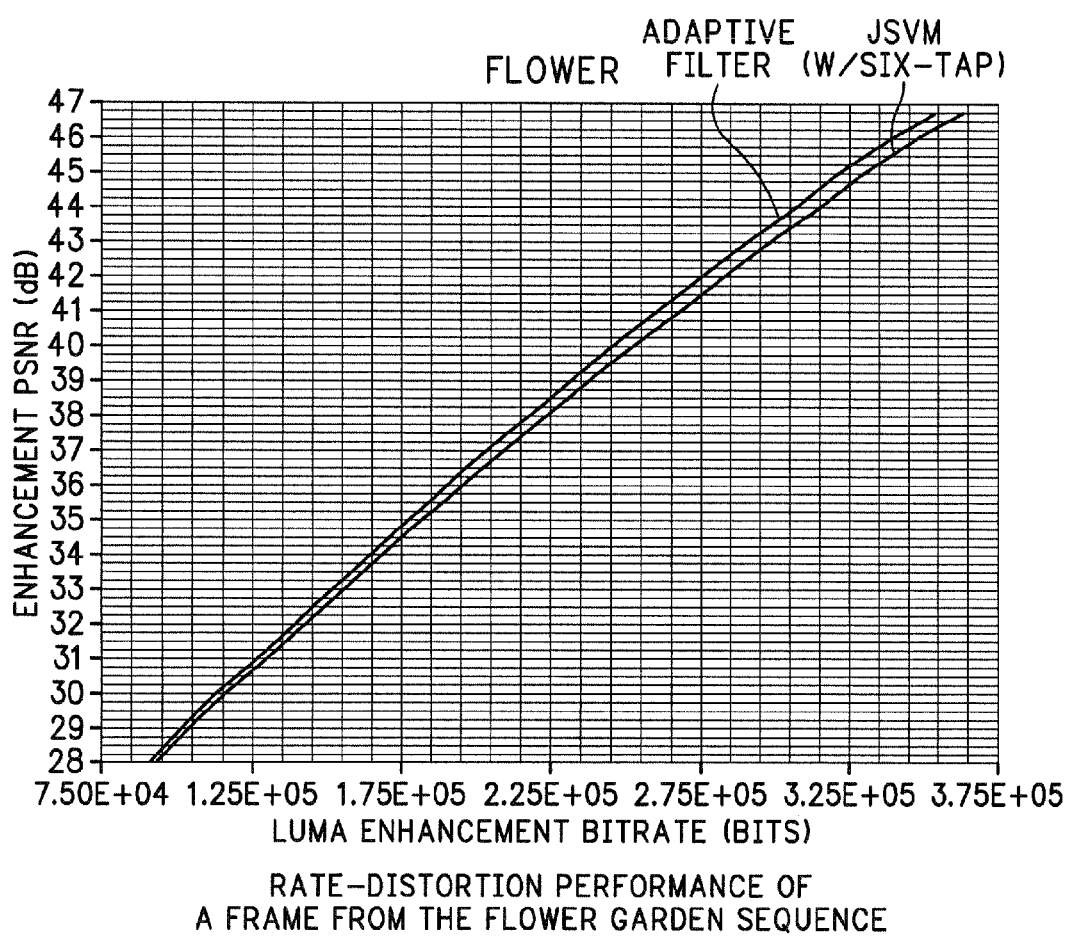
Figure 10:
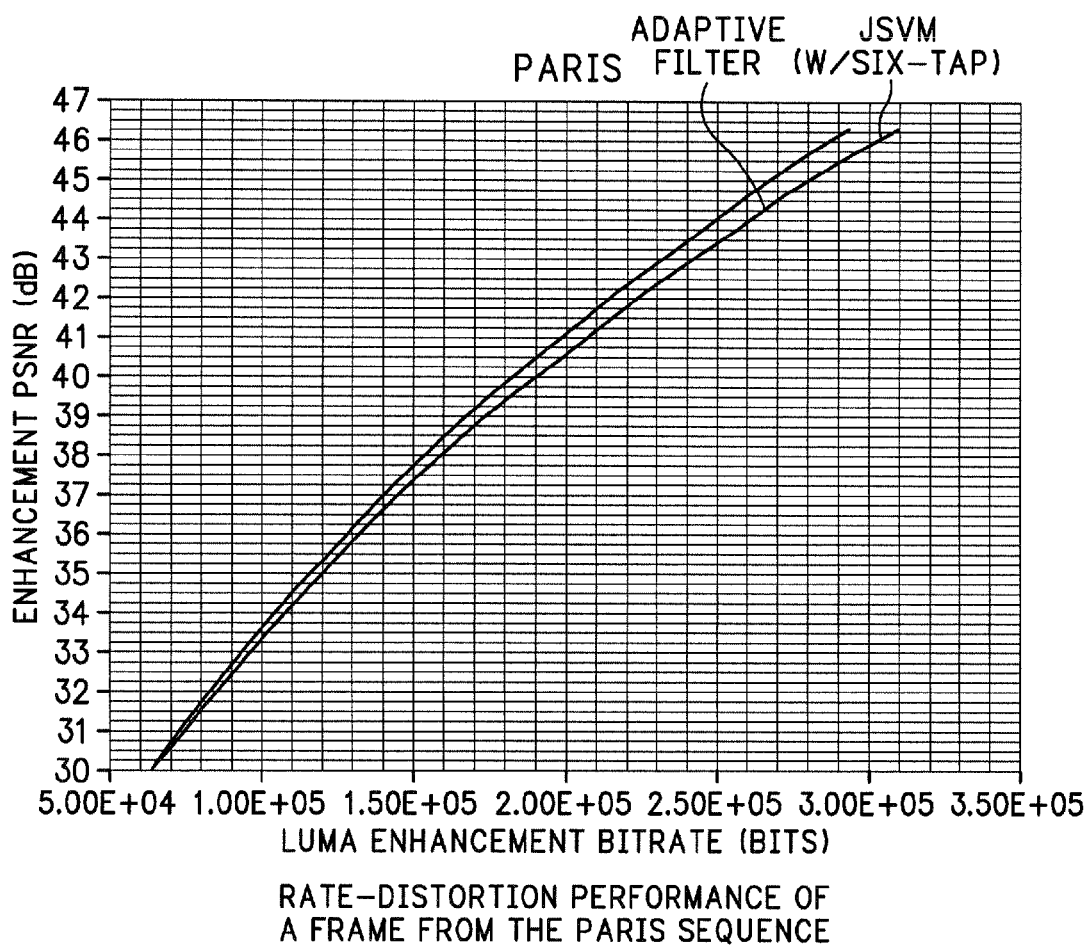

FIG. 6 shows the decoder 200 in further detail. The encoded base-layer bit stream 32 is received by the low resolution decoder 202. A residual decoding operation 264 first processes the base-layer data 32 and may include entropy decoding, inverse transform, and de-quantizer operations. The results of the residual decoding operations 264 are added with any results available from an intra-frame prediction operation 262 that predicts image blocks from spatially adjacent blocks in the same frame. An inverse motion compensation operation 266 predicts the image blocks from temporally adjacent frames and generates the reconstructed low-resolution video 214. The reconstructed frames 260 are stored and then fed back to the intra-block prediction operation 262 and the inverse motion compensation operation 266.

The reconstructed frames 260 are also fed into the adaptive spatial up-sampler 208 for generating high-resolution up-sampled blocks 218. The up-sampled blocks 218 are a form of intra-block prediction and accordingly are fed into an intra-prediction operation 256 in the high-resolution decoder 210.

The enhanced layer bit stream 46 is fed into the high resolution decoder 210. The residual decoding operation 250 conducts entropy decoding, an inverse transform, and dequantization. The decoded residuals from decoding operation 250 are then added with the results from intra-prediction operation 256 and any inter-frame prediction results from an inverse motion compensation operation 252. The reconstructed high-resolution video 212 is output and the reconstructed high-resolution frames 258 are stored and then fed back to the intra-prediction operation 256 and the inter-frame prediction operation 252.

In one implementation, when the receiving device has a standard low-resolution display system, the reconstructed low-definition video 214 is used for displaying on the receiving device display screen. For example, a standard definition television. Alternatively, if the receiving device accommodates high-definition video, the reconstructed high-resolution video 212 is displayed on the high definition display screen for the receiving device. For example, a high-definition television.

The encoder 12 shown in FIGS. 1-4 and the decoder 200 shown above in FIGS. 4-6 can each be implemented using one or more Digital Signal Processors (DSPs) and Central Processing Units (CPUs) in combination with memory and possibly other integrated circuitry or combinational logic. In these implementations, some or all of the separate logical functions described above in the encoder 12 and decoder 200 may be implemented in software that is executed by the DSPs and/or CPUs.

Selecting Up-Sample Filters

As described above, local image properties can be used to classify image blocks (for example, 4×4 pixels in size) into a predetermined number of classes. One example of local image properties that can be used are local image patterns. For example, image blocks 16 (FIG. 1) can be classified into classes such as: 1) horizontal pattern, 2) vertical pattern, 3) 45-degree diagonal pattern, 4) 135-degree diagonal pattern, and 5) other. The up-sample filters that are used for reconstructing the high-resolution frames can be selected according to these local image properties.

A second example further classifies the blocks by pattern strength and pattern orientation, so that the image block classes include blocks with "strong horizontal features and a positive slope in the intensity space" or "weak vertical feature with negative slope in the intensity space". In this example, if more vertical residual data exists in the encoded bit stream, a first group of up-sample filters may be used for up-sampling the low-resolution blocks. If the encoded bit stream contains more horizontal residual data, a second group of up-sample filters may used for up-sampling the low-resolution blocks.

Image blocks can also be classified into different classes according to overall energy levels with respect to a set of predetermined thresholds. If there is very little residual information and there is not much prediction for a block, then it may be assumed that the image block is relatively smooth such that the pixels do not significantly change. In this situation, the interpolation up-sample filter may be of less importance than in a more complex image block. In this example, the spatial up-sampler may choose a less complex up-sample filter.

Using a collection of classified blocks as training data, an optimal filter for each class is obtained. This optimal filter can be limited to a 2 Dimensional (2D)-separable filter and/or a specified maximal size. The optimal filter design process can be accomplished with a suitable training method, e.g. least-squares, constrained least-squares, and/or Bayesian maximum a posterior methods, and can be performed either off line (i.e., not in video codec) or in real-time. Designing the filters off line also makes it unnecessary to transmit the filter coefficients in a side-channel to the decoder.

Intra-Prediction Modes

In H.264 (aka, MPEG-4 Part 10 AVC) or the first WD (Working Draft) of MPEG SVC, intra prediction modes are used to increase the coding efficiency for intra blocks. There are 9 modes for either Intra_4×4 prediction or Intra_8×8 prediction, which represent 8 different directional predictions and a DC prediction, respectively. There are 4 modes for either Intra_16×16 prediction or Intra chroma prediction, which include DC, horizontal, vertical, and plane prediction modes.

Most of these intra-prediction modes represent directional prediction modes, which have a close relationship with the best up-sampling filter since the best up-sampling filter probably should be aligned relative to the prediction direction. Furthermore, the information of intra prediction modes has already been sent to the decoder, and is therefore available at both the encoder and the decoder.

One embodiment of the adaptive spatial up-sampler uses the intra-prediction mode used in the intra-prediction operations 104 and 262 (FIGS. 3 and 6) for the low-resolution layer as one of the parameters for selecting a suitable up-sampling filter for both the encoder 12 and decoder 200. A simple form of this approach is to only use the intra-prediction mode to select the up-sampling filter at both the encoder 12 and decoder 200. In this embodiment, there is no need to send side information since the intra-prediction mode is already available at both the encoder 12 and decoder 200.

Another approach uses the intra-prediction mode information as one of multiple parameters used for determining the up-sample filter. For example, the intra-prediction mode can be used in combination with other vertical or horizontal residual information that is identified in the encoded data.

In yet another embodiment, the residual information and intra-prediction information may be used to identify up-sample filters for some image blocks while the up-sample filters for other image blocks are explicitly identified. This may happen when the encoder determines that the up-sample filter derived from the residual and intra-prediction information does not provide the optimal up-sample filter for generating the up-sampled image block.

In the JSVM 0 of SVC, the inter-layer intra texture prediction (i.e., the intra texture prediction using information from the next lower spatial resolution) is provided in the I_BL macroblock mode. Furthermore, the usage of the I_BL mode in a high-pass picture may only be allowed for the macroblock for which the corresponding 8×8 block of the base layer 32 is located inside an intra-coded macroblock (in order to require only the inverse MCTF for the spatial layer that is actually decoded). Thus, the I_BL macroblock mode performs an up-sample from a lower spatial resolution image block having a 8×8 size, and the corresponding 8×8 block will have intra prediction mode information that can also be used to select an up-sample filter.

Adaptive Up-Sample Filter Examples

Equation 1 shows one technique for estimating a block of high-resolution image pixels from a block of low-resolution image pixels. The mapping from low-resolution to high-resolution is accomplished with a separable poly-phase filter and is given in one dimension as $$HighRes(x) = \sum_{t=-2}^{3} \text{Filter}\,(S \cdot t - x \,\%\, S) \cdot LowRes(x/S + t), \quad (1)$$

where x % S and x/S are respectively the mod-S and integer division operator and S is the scale factor. It is assumed that S=2. In this case, equation (1) is a two-phase filter where each filter contains six-taps. Of course other types of filters can also be used.

In the current JSVM specification, the coefficients for the filter in equation (1) do not change across the image frame. However, the filter coefficients can be adjusted in this example. Adjustment is performed on a 4×4 block basis with respect to the high-resolution image, and it is accomplished by selecting an interpolation filter from a pre-defined filter bank for each of the horizontal and vertical directions. The filter bank 36 in this example contains four members defined below in Table 1. The construction of the filter bank augments the current six-tap filter with three alternative (and computationally simpler) interpolation kernels. The additional filters include two sample-and-hold procedures as well as a bi-linear interpolator.

TABLE 1

Four filters of the proposed filter-bank

| Filter | Taps | | | | | | | | | | | |
|---|---|---|---|---|---|---|---|---|---|---|---|---|
| 0 | 1 | 0 | -5 | 0 | 20 | 32 | 20 | 0 | -5 | 0 | 1 | 0 |
| 1 | 0 | 0 | 0 | 0 | 0 | 32 | 32 | 0 | 0 | 0 | 0 | 0 |
| 2 | 0 | 0 | 0 | 0 | 32 | 32 | 0 | 0 | 0 | 0 | 0 | 0 |
| 3 | 0 | 0 | 0 | 0 | 16 | 32 | 16 | 0 | 0 | 0 | 0 | 0 |

The coefficients in table 1 are represented with five-bits of precision. Selection of the interpolation filter is performed at the encoder 12 and signaled to the decoder 200. Signaling for the horizontal and vertical filters can be performed independently, and can be included within the enhancement bit-stream.

Sixteen different up-sample blocks can be generated from the four filters in Table 1. For example, the first filter can be used in the horizontal direction and the vertical direction. In another combination, the first filter may be used in the horizontal direction and one of the other filters used in the vertical direction, etc. The filter combination in the horizontal and vertical direction that generates the lowest cost can then be selected.

The following is a more detailed explanation of the filter selection process described above in FIG. 2. First, the cost of signaling each candidate filter is estimated with an adaptive arithmetic code. Context adaptive coding might not be used here although it is possible to further reduce the side-channel bits. Next, the block is interpolated with each candidate filter and the resulting residual coded with a specified quality Qp. The filter is then chosen that minimizes the number of total bits, where total bits is defined as the sum of residual and side-channel bits. Minimizing the total bit rate over all available filters such that (s.t.) every image block will be coded with the same quality can be represented as follows $$\arg\min_F R_F \quad s.t. \quad D_F = D, \qquad (2)$$

where F is the set of candidate filters, $D_F$ and $R_F$ are respectively the distortion and rate of signaling for the filter F and coding the interpolation residual with the specified Qp, and $$R_F = \text{Side}_F + \text{Residual}_F$$

where $\text{Side}_F$ is the cost (in bits) of signaling a specific filter, and $\text{Residual}_F$ is the cost (in bits) of transmitting the difference between the up-sampled and original high-resolution blocks.

Experimental Results

To evaluate the performance, the adaptive spatial up-sampler was incorporated into the JSVM 1.0 encoder. The encoder was modified to apply the adaptive up-sampler to IntraBL-mode luminance blocks and to signal the interpolation filters in a separate side-channel. The filter bank defined in Table 1 was utilized and the impact of the adaptive up-sampling measured for compression efficiency of the IntraBL-mode blocks. A test bit stream used the conditions in Table 2.

TABLE 2

| Simulation condition | |
|---|---|
| Number of Layers | 2 |
| GOP Size | 1 |
| Intra Period 1 | 1 |
| Base Layer | |
| Resolution | QCIF |
| AVC Compatible | Yes |
| FRExt Mode | No |
| Intra mode Usage | On |
| Enhancement Layer | |
| Resolution | CIF |
| AVC Compatible | No |
| FRExt Mode | No |
| Intra mode Usage | On |

The results from adaptive up-sampling several different images are shown below in FIGS. 7-10 with Qp values in the range [15,35]. Rate-distortion performance is captured for each enhanced intra-frame by extracting the bit information within the JSVM block decision loop. The bits needed to code the residual were extracted as well as the side channel information for the IntraBL mode. The bits needed to code the IntraBL residual for the unmodified JSVM were also extracted. In both cases, only the cost of coding the luma channel was considered. In FIGS. 7-10, the performance of the unmodified JSVM (i.e., without the adaptive up-sampler) is denoted by the "JSVM (w/six-tap)" data points.

As can be seen from FIGS. 7-10, the adaptive spatial up-sampling improves the performance of the IntraBL blocks for each sequence. For example, the up-sampler provides 0.7 dB of improvement in the Mobile and Calendar sequence in FIG. 7 when the enhancement Power Signal to Noise Ratio (PSNR) is 38 dB. For the remaining sequences in FIGS. 8-10, the adaptive up-sampler provides 0.4 dB of improvement when the enhancement PSNR is 38 dB.

Performance of the adaptive up-sampler depends on the quality of the base layer data. This is also evident in FIGS. 7-10, as the gain introduced by the adaptive up-sampler depends on the enhancement PSNR. The examples in FIGS. 7-10 utilize the same Qp for both base and enhancement layers, and so the PSNR of the two layers are similar. For example, the adaptive up-sampler provides 0.9 dB of improvement for the Mobile and Calendar sequence at the 45 dB enhancement point. The other sequences show additional gains. The Bus, Flower Garden and Paris sequences in FIGS. 8-10, respectively, show improvements of 0.6 dB, 0.5 dB and 0.7 dB, respectively, at the 45 dB enhancement point.

Side-Channel Signaling

The bit-stream can be defined in the current JSVM. Four syntax elements can be introduced into the bit-stream. The upsample_filter_luma_horz and upsample_filter_luma_vert elements are arrays that contain the filter IDs for each luma block in the current macroblock. When the macroblock is signaled with the 8×8 transform size, these arrays can contain filter IDs for the four (4) 8×8 blocks within the macroblock. In another embodiment, the arrays can contain filter IDs for each of the sixteen (16) 4×4 blocks within the macroblock.

An upsample_filter_chroma_horz and upsample_filter_chroma_vert element can be arrays that contain the filter IDs for each chroma block in the current macroblock. The number of blocks can vary relative to the color sampling density. It is also possible that different up-sample filter banks may be used for the luma and chroma elements as described above in FIG. 4. Modifications require to be made to the JSVM syntax are shown below in Appendix A. Note that the modifications are shaded to facilitate identification.

The decoder receives the syntax elements defined above and also receives the collocated block from the lower-resolution frame and a pre-defined FilterBank[ ] data structure. The decoder then produces the high resolution block as an output. The high resolution block is generated by interpolating the lower-resolution frames with the interpolation kernels InterpH and InterpV. The interpolation kernels are defined for the luma blocks as follows:

$$InterpH[\ ]=FilterBank[transform\_size\_flag\_8\times8][upsample\_filter\_luma\_horz[i]][\ ]$$

$$InterpV[\ ]=FilterBank[transform\_size\_flag\_8\times8][upsample\_filter\_luma\_vert[i]][\ ],$$

Where transform_size_flag_8×8 is a binary value defined in the bit-stream, and i is the block index within the current macroblock. The interpolation kernels are defined for the chroma blocks in a similar manner:

$$InterpH[\ ]=FilterBank[isCb(i)+2][upsample\_filter\_chroma\_horz[i]][\ ]$$

$$InterpV[\ ]=FilterBank[isCb(i)+2][upsample\_filter\_chroma\_vert[i]][\ ],$$

where i is the block index within the chroma blocks of the current macroblock and isCb(i) returns one (1) if block i corresponds to the Cb component of the signal and zero (0) otherwise.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

APPENDIX A

| Macroblock layer in scalable extension syntax | | |
|---|---|---|
| macroblock_layer_in_scalable_extension( ) { | C | Descriptor |
|   if( base_layer_id_plus1 ! = 0 && adaptive_prediction_flag ) | | |
| { | | |
|     base_layer_mode_flag | 2 | ae(v) |
|     if( ! base_layer_mode_flag && HalfResolutionBaseLayer && | | |
|       ! IntraBaseLayerMacroblock) | | |
|       base_layer_refinement_flag | 2 | ae(v) |
| } | | |
| if( ! base_layer_mode_flag && ! base_layer_refinement_flag ) { | | |
|   mb_type | 2 | ae(v) |
|   if( mb_type == I_NxN && base_layer_id_plus1 != 0 ) | | |
|     intra_base_flag | 2 | ae(v) |
| } | | |
| if( MbType == I_PCM) { | | |
|   while( !byte_aligned( )) | | |
|     pcm_alignment_zero_bit | 2 | f(1) |
|   for( i = 0; i < 256; i++ ) | | |
|     pcm_sample_luma[i ] | 2 | u(v) |
|   for( i = 0; i < 2 * MbWidthC * MbHeightC; i++ ) | | |
|     pcm_sample_chroma[i ] | 2 | u(v) |
| } else { | | |
|   NoSubMbPartSizeLessThan8x8Flag = 1 | | |
|   if( MbType != I_NxN && MbType != I_BL && | | |
|     MbPartPredMode( MbType, 0 ) != Intra_16x16 && | | |
|     NumMbPart( MbType ) == 4 ) { | | |
|     if( ! base_layer_mode_flag ) | | |
|       sub_mb_pred_in_scalable_extension( MbType ) | 2 | |
|     for( mbPartIdx = 0; mbPartIdx < 4; mbPartIdx++) | | |
|       if( SubMbType[ mbPartIdx ] != B_Direct_8x8 ) { | | |
|         if( NumSubMbPart( SubMbType[ mbPartIdx ] ) > 1 | | |

Macroblock layer in scalable extension syntax

| | C | Descriptor |
|---|---|---|
| macroblock_layer_in_scalable_extension( ) { | | |
| ) | | |
|                       NoSubMbPartSizeLessThan8x8Flag = 0 | | |
|             } else if( !direct_8x8_inference_flag ) | | |
|                 NoSubMbPartSizeLessThan8x8Flag = 0 | | |
|     } else { | | |
|         if( transform_8x8_mode_flag && | | |
|             ( MbType == I_NxN \|\| MbType == I_BL )) | | |
|             transform_size_8x8_flag | 2 | ae(v) |
|         mb_pred_in_scalable_extension( MbType ) | 2 | |
|     } | | |
|     if( MbPartPredMode( MbType, 0) != Intra_16x16 ) { | | |
|         coded_block_pattern | 2 | ae(v) |
|         if( CodedBlockPatternLuma > 0 && | | |
|             transform_8x8_mode_flag && MbType != I_NxN && | | |
|             MbType != I_BL && | | |
| NoSubMbPartSizeLessThan8x8Flag && | | |
|             !( MbPartPredMode( MbType, 0) == | | |
| B_Direct_16x16 && | | |
|             !direct_8x8_inference_flag ) ) | | |
|             transform_size_8x8_flag | 2 | ae(v) |
|     } | | |
|     if( CodedBlockPatternLuma > 0 \|\| | | |
| CodedBlockPatternChroma > 0 \|\| | | |
|         MbPartPredMode( MbType, 0 ) == Intra 16x16 ) { | | |
|         mb_qp_delta | 2 | ae(v) |
|         residual_in_scalable_extension( ) | 3 \| 4 | |
|     } | | |
|   } | | |
| } | | |

Macroblock prediction syntax in scalable extension

| | C | Descriptor |
|---|---|---|
| mb_pred_in_scalable_extension( MbType ) { | | |
|   if( MbPartPredMode( MbType, 0 ) == Intra_4x4 \|\| | | |
|       MbPartPredMode( MbType, 0 ) == Intra_8x8 \|\| | | |
|       MbPartPredMode( MbType, 0) == Intra_16x16 \|\| | | |
|       MbPartPredMode( MbType, 0 ) == Intra_Base ) { | | |
|     if( MbPartPredMode( MbType, 0 ) == Intra_4x4 ) | | |
|       for( luma4x4BlkIdx=0; luma4x4BlkIdx<16; luma4x4BlkIdx++ ) { | | |
|         prev_intra4x4_pred_mode_flag[ luma4x4BlkIdx ] | 2 | ae(v) |
|         if( !prev_intra4x4_pred_mode_flag[luma4x4BlkIdx ] ) | | |
|             rem_intra4x4_pred_mode[ luma4x4BlkIdx ] | 2 | ae(v) |
|       } | | |
|     if( MbPartPredMode( MbType, 0 ) == Intra_8x8 ) | | |
|       for( luma8x8BlkIdx=0; luma8x8BlkIdx<4; luma8x8BlkIdx++ ) { | | |
|         prev_intra8x8_pred_mode_flag[ luma8x8BlkIdx ] | 2 | ae(v) |
|         if( !prev_intra8x8_pred_mode_flag[ luma8x8BlkIdx ] ) | | |
|             rem_intra8x8_pred_mode[ luma8x8BlkIdx ] | 2 | ae(v) |
|       } | | |
|     if( chroma_format_idc != 0 && | 2 | ae(v) |
|       MbPartPredMode( MbType, 0 ) != Intra_Base ) | | |
|       intra_chroma_pred_mode | 2 | ae(v) |
|     if( MbPartPredMode( MbType, 0 ) == Intra_Base ){ | | |
|       if( transform_size_8x8_flag == 0 ){ | | |

-continued

Macroblock prediction syntax in scalable extension

| mb_pred_in_scalable_extension( MbType ) { | C | Descriptor |
|---|---|---|
| ██ for( luma4x4BlkIdx=0; luma4x4BlkIdx<16; luma4x4BlkIdx++ ) { | | |
| ██ upsample_filter_luma_horz[ luma4x4BlkIdx ] | 2 | ae(v) |
| ██ upsample_filter_luma_vert[ luma4x4BlkIdx ] | 2 | ae(v) |
| ██ } | | |
| ██ }else{ | | |
| ██ for( luma8x8BlkIdx=0; luma8x8BlkIdx<4; luma8x8BlkIdx++ ) { | | |
| ██ upsample_filter_luma_horz[ luma8x8BlkIdx ] | 2 | ae(v) |
| ██ upsample_filter_luma_vert[ luma8x8BlkIdx ] | 2 | ae(v) |
| ██ } | | |
| NumC8x8 = 4 / ( SubWidthC * SubHeightC ) | | |
| for( iCbCr = 0; iCbCr < 2; iCbCr++ ) | | |
| for( i8x8 = 0; i8x8 < NumC8x8; i8x8++ ){ | | |
| ██ upsample_filter_chroma_horz[ iCbCr ][ i8x8 ] | 2 | ae(v) |
| ██ upsample_filter_chroma_vert[ iCbCr ][ i8x8 ] | 2 | ae(v) |
| ██ } | | |
| } else if( MbPartPredMode( MbType, 0 ) != Direct && | | |
|     MbPartPredMode( MbType, 0) != Intra_Base && | | |
|     ! base_layer_mode_flag ) { | | |
|   if( ! base_layer_refinement_flag ) { | | |
|     if( base_layer_id_plus1 ! = 0 ) { | | |
|       for( mbPartIdx = 0; mbPartIdx < NumMbPart( MbType ); mbPartIdx++) | | |
|         if( MbPartPredMode( MbType, mbPartIdx ) != Pred_L1 && | | |
|           MbPartPredMode( MbTypeBase, mbPartIdx) != Pred_L1 ) | | |
|           motion_prediction_flag_l0[ mbPartIdx ] | 2 | ae(v) |
|       for( mbPartIdx = 0; mbPartIdx < NumMbPart( MbType ); mbPartIdx++) | | |
|         if( MbPartPredMode( MbType, mbPartIdx ) != Pred_L0 && | | |
|           MbPartPredMode( MbTypeBase, mbPartIdx ) != Pred_L0 ) | | |
|           motion_prediction_flag_l1[ mbPartIdx ] | 2 | ae(v) |
|     } | | |
|     for( mbPartIdx = 0; mbPartIdx < NumMbPart( MbType ); mbPartIdx++) | | |
|       if( ( num_ref_idx_l0_active_minus1 > 0 \|\| | | |
|         mb_field_decoding_flag ) && | | |
|         MbPartPredMode( MbType, mbPartIdx ) != Pred_L1 && | | |
|         ! motion_prediction_flag_l0[ mbPartIdx ] ) | | |
|         ref_idx_l0[ mbPartIdx ] | 2 | ae(v) |
|     for( mbPartIdx = 0; mbPartIdx < NumMbPart( MbType ); mbPartIdx++) | | |
|       if( ( num_ref_idx_l1_active_minus1 > 0 \|\| | | |
|         mb_field_decoding_flag ) && | | |
|         MbPartPredMode( MbType, mbPartIdx ) != Pred_L0 && | | |
|         ! motion_prediction_flag_l1[ mbPartIdx ] ) | | |

-continued

Macroblock prediction syntax in scalable extension

```
mb_pred_in_scalable_extension( MbType ) {                              C   Descriptor
                            ref_idx_l1[ mbPartIdx ]                    2   ae(v)
            for( mbPartIdx = 0; mbPartIdx < NumMbPart( MbType );
mbPartIdx++)
                if( MbPartPredMode ( MbType, mbPartIdx ) != Pred_L1 )
                    for( compIdx = 0; compIdx < 2; compIdx++ )
                        mvd_l0[ mbPartIdx ][ 0 ][ compIdx ]             2   ae(v)
            for( mbPartIdx = 0; mbPartIdx < NumMbPart( MbType );
mbPartIdx++)
                if( MbPartPredMode( MbType, mbPartIdx ) != Pred_L0 )
                    for( compIdx = 0; compIdx < 2; compIdx++ )
                        mvd_l1[ mbPartIdx ][ 0 ][ compIdx ]             2   ae(v)
        } else {
            for( mbPartIdx = 0; mbPartIdx < NumMbPart( MbType );
mbPartIdx++)
                if( MbPartPredMode ( MbType, mbPartIdx ) != Pred_L1 )
                    for( compIdx = 0; compIdx < 2; compIdx++ )
                        mvd_ref_l0[ mbPartIdx ][ 0 ][ compIdx ]         2   ae(v)
            for( mbPartIdx = 0; mbPartIdx < NumMbPart( MbType );
mbPartIdx++)
                if( MbPartPredMode( MbType, mbPartIdx ) != Pred_L0 )
                    for( compIdx = 0; compIdx < 2; compIdx++ )
                        mvd_ref_l1[ mbPartIdx ][ 0 ][ compIdx ]         2   ae(v)
        }
    }
}
```

The invention claimed is:

1. A method for processing data, the method comprising:
adaptively selecting between multiple available up-sample filters for up-sampling individual image blocks;
using the selected up-sample filters to convert associated low-resolution image blocks into up-sampled high-resolution image blocks;
using the up-sampled high-resolution image blocks to either encode or decode a high-resolution image;
generating different up-sampled image blocks by applying different combinations of up-sample filters to the same low-resolution image blocks;
comparing the different up-sampled image blocks with corresponding high-resolution image blocks in a high-resolution image sequence; and
selecting the combination of up-sample filters for different image blocks according to residuals resulting from the comparisons.

2. The method according to claim 1 including identifying properties associated with the individual image blocks and selecting the up-sample filters according to the identified properties.

3. The method according to claim 2 wherein the properties include any combination of the following:
an intra-prediction mode used for the image blocks;
an image pattern associated with the image blocks;
an amount of residual data associated with the image blocks;
a size of the image blocks; or
a luma or chroma associated with the image blocks.

4. The method according to claim 1 including:
providing a filter bank of multiple different up-sample filters having different numbers of filter taps; and
selecting different combinations of the multiple different up-sample filters for up-sampling the low-resolution image blocks.

5. A method for processing data, the method comprising:
adaptively selecting between multiple available up-sample filters for up-sampling individual image blocks;
using the selected up-sample filters to convert associated low-resolution image blocks into up-sampled high-resolution image blocks;
using the up-sampled high-resolution image blocks to either encode or decode a high-resolution image;
identifying which up-sample filters are selected for the different image blocks; and
sending the up-sample filter identifiers associated with the different image blocks to a decoder.

6. The method according to claim 5 including:
determining costs associated with sending the up-sample filter identifiers to the decoder; and
not sending the up-sample filter identifiers to the decoder for image blocks that have associated costs above a predetermined threshold.

7. The method according to claim 6 including:
using the identified up-sample filters to up-sample associated low-resolution image blocks in the decoder; and
using default up-sample filters in the decoder to up-sample low-resolution image blocks when no up-sample filters are identified for associated image blocks.

8. The method according to claim 5 including identifying multiple image blocks that use a same up-sample filter combination and sending a single up-sample filter identifier to the decoder for all of the identified multiple image blocks.

9. The method according to claim 5 including identifying properties associated with the individual image blocks and selecting the up-sample filters according to the identified properties.

10. The method according to claim 9 wherein the properties include any combination of the following:
an intra-prediction mode used for the image blocks;
an image pattern associated with the image blocks;
an amount of residual data associated with the image blocks;

a size of the image blocks; or a luma or chroma associated with the image blocks.

11. The method according to claim 5 including:

providing a filter bank of multiple different up-sample filters having different numbers of filter taps; and selecting different combinations of the multiple different up-sample filters for up-sampling the low-resolution image blocks.

12. A system for processing data, the system comprising:

an encoder selecting between different combinations of up-sample filters for up-sampling individual low-resolution image blocks when encoding an image sequence; and a decoder selecting between different combinations of up-sample filters for up-sampling individual low-resolution image blocks when decoding the encoded image sequence;

wherein the decoder includes multiple different sets of up-sample filters and the encoder identifies which of the different sets of up-sample filters the decoder should use.

13. The system according to claim 12 wherein the encoder selects the different up-sample filters according to how well resulting up-sampled high-resolution image blocks predict corresponding high-resolution blocks.

14. The system according to claim 13 wherein the up-sample filters selected by the encoder are identified to the decoder, and the decoder then uses the encoder identified up-sample filters for up-sampling corresponding low-resolution image blocks in the encoded image sequence.

15. The system according to claim 12 wherein the decoder predicts the up-sample filters independently of the encoder unless the decoder receives override signals from the encoder that direct the decoder to use other up-sample filters.

16. The system according to claim 15 wherein the independent selections by the decoder are according to properties associated with the individual image blocks.

17. The system according to claim 15 wherein the override signals sent by the encoder either explicitly identify which up-sample filters the decoder should use or direct the decoder to switch to different up-sample filters.

18. The system according to claim 12 wherein the encoder signals the decoder to use the different sets of up-sample filters for different combinations of image blocks or for different luma and chroma blocks in the encoded image sequence.

19. An apparatus, comprising:

a processor configured to adaptively select between multiple available up-sample filters for up-sampling individual image blocks;

the processor configured to use the selected up-sample filters to convert associated low-resolution image blocks into up-sampled high-resolution image blocks;

the processor configured to use the up-sampled high-resolution image blocks to encode a high-resolution image;

the processor configured to identify which up-sample filters are selected for the different image blocks; and the processor configured to send the up-sample filter identifiers associated with the different image blocks to a decoder.

20. The apparatus of claim 19 including:

the processor configured to determine costs associated with sending the up-sample filter identifiers to the decoder; and the processor configured to send the up-sample filter identifiers to the decoder only for those image blocks that have associated costs that do not exceed a preset threshold.

21. The apparatus of claim 19 wherein the processor is configured to identify multiple image blocks that use a same up-sample filter combination and send a single up-sample filter identifier to the decoder for all of the identified multiple image blocks.

* * * * *